(12) United States Patent
Krause

(10) Patent No.: US 6,427,557 B1
(45) Date of Patent: Aug. 6, 2002

(54) DEVICE FOR REMOVING A PROTECTIVE LAYER FROM AN OPTICAL WAVEGUIDE

(75) Inventor: Dieter Krause, Uffing Am Staffelsee (DE)

(73) Assignee: Siemens Production and Logistics Systems AG (DE)

( * ) Notice: Subject to any disclaimer, the term of this patent is extended or adjusted under 35 U.S.C. 154(b) by 0 days.

(21) Appl. No.: 09/762,335
(22) PCT Filed: Jul. 5, 1999
(86) PCT No.: PCT/DE99/02073
§ 371 (c)(1), (2), (4) Date: Jun. 8, 2001
(87) PCT Pub. No.: WO00/08501
PCT Pub. Date: Feb. 17, 2000

(30) Foreign Application Priority Data

Aug. 5, 1998 (DE) ..................................... 298 14 057 U

(51) Int. Cl.[7] ................................................. H02G 1/12
(52) U.S. Cl. .............................. 81/9.51; 81/9.4; 81/9.44
(58) Field of Search ......................... 81/9.4, 9.41, 9.44, 81/9.51

(56) References Cited

U.S. PATENT DOCUMENTS 3,107,287 A * 10/1963 Schechter ...................... 81/9.4
5,033,335 A * 7/1991 Yatsu et al. .................... 81/9.4

* cited by examiner

Primary Examiner—James G. Smith
(74) Attorney, Agent, or Firm—Harness, Dickey & Pierce, PLC.

(57) ABSTRACT

The device is provided with a heating jaw, which softens the protective layers of optical fibers in order to be able to cut them more easily and to pull them off. For particularly thick optical fibers, the heating jaw is provided with a longitudinal groove with which the contact surface to the optical fiber is enlarged and the heating of the protective layer is accelerated.

2 Claims, 1 Drawing Sheet

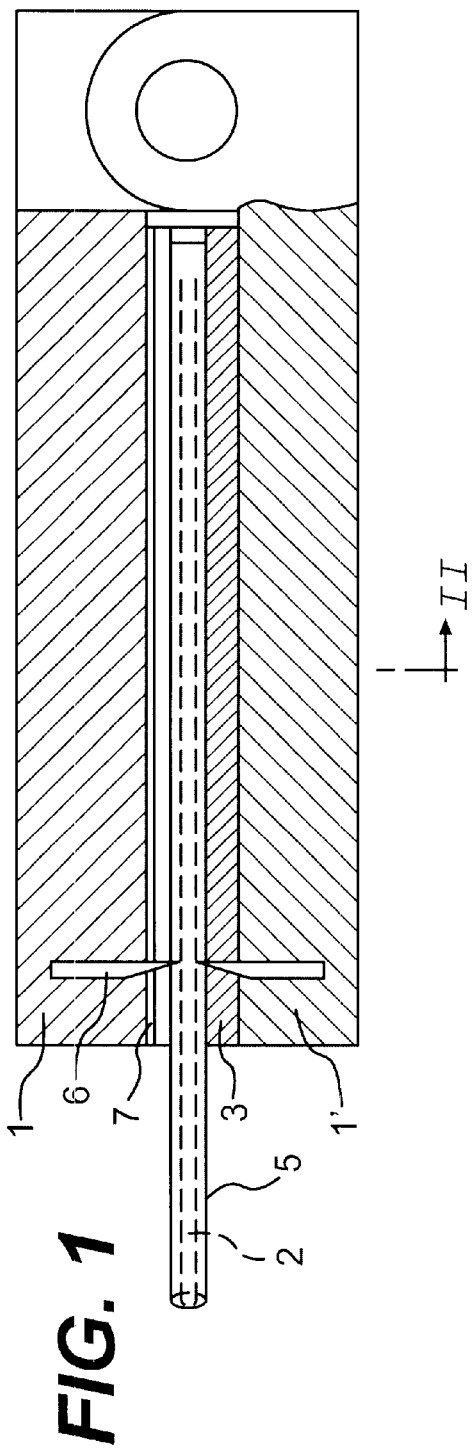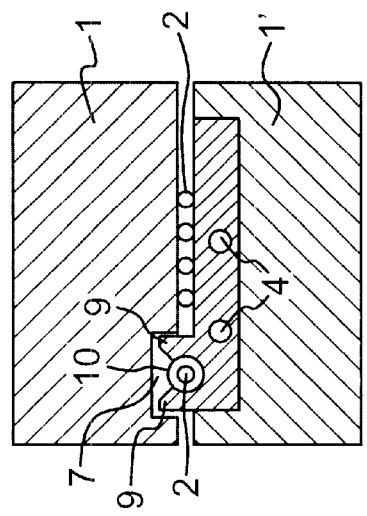

DEVICE FOR REMOVING A PROTECTIVE LAYER FROM AN OPTICAL WAVEGUIDE

BACKGROUND OF THE INVENTION

The invention relates to a device for removing a protective layer of an optical fiber, whereby one end of the optical fiber can be inserted between two clamping jaws of a pull-off device, whereby at least one of said clamping jaws has a heating jaw.

In U.S. Pat. No. 5,033,335, such heating jaws are provided with a flat surface, which is tangential with the optical fiber. Given optical fibers having a normal thickness, this line contact is sufficient for heating and softening the protective layer. Subsequently, the end of the optical fiber can be pulled out of the device, whereby the pull-off edges retain the softened protective layer. In column 6, lines 66 and 67, the patent states that; the heating plate can also be provided with grooves for accepting the optical fibers. Such a device, however, is not suitable for a ribbon cable having different spaces between the individual fibers.

Given the utilization of such devices, it can be the case that optical fibers of different diameters are to be treated. Given equal conditions, thicker optical fibers require a considerably longer heating duration than thinner ones, whereby this can be achieved by different devices or by an adjustable heating duration.

SUMMARY OF THE INVENTION

An object of the invention is to create a device that is suitable for optical fibers with different diameters.

This object is inventively achieved by a device for removing a protective layer or cladding of at least one optical fiber, said device being a pull-off device having two clamping jaws with at least one jaw being a heated jaw against which fibers can be placed as they are inserted between the jaws, at least one of the jaws having a pull-off edge which cuts into the protective layer of a fiber when the jaws are pressed together and the at least one of the jaws has a longitudinal groove which is fashioned for accepting thicker optical fibers between two raised ribs of the heating jaw, the opposite clamping jaw having a corresponding recess for the ribs and thinner optical fibers can be inserted between two flat surface sections of the clamping jaws adjacent the recess and ribs.

As a result of the invention, it is possible to simultaneously insert optical fibers having a large cross-section and having a normal cross-section into the clamping device in a plane and to pull them out. Since the flat section is arranged next to the longitudinal groove, different heating conditions are created in a device, so that a same heating duration is enabled for different diameters. The contact surface between the heating jaws and the optical fiber is considerably enlarged in the longitudinal groove and is distributed to a plurality of locations of the circumference, for example given V-shaped longitudinal grooves in cross-section, so that the protective layer is heated and softened faster than it is the case between the flat jaws.

The thinner optical fibers are inserted into the flat section and are heated with a small contact surface, and the heating duration is approximately the same as for the thicker optical fiber. As a result thereof, the different optical fibers can be inserted and dismantled at the same time. This is associated with the advantage that an adjustment function of the heating duration can be foregone even with respect to a separate processing. A plurality of fibers can be simultaneously inserted into the flat section with different spaces from one another.

A large-surface contact is achieved between the optical fiber and the heating jaw as a result of the circular sector-shaped cross-section of this groove.

The invention is subsequently explained in greater detail on the basis of an exemplary embodiment shown in the drawing.

BRIEF DESCRIPTION OF THE DRAWINGS

FIG. 1 is a longitudinal section through a pull-off device with an inserted optical fiber; and FIG. 2 is a cross-section through the pull-off device along the line II-II in FIG. 1.

DESCRIPTION OF THE PREFERRED EMBODIMENT

As shown in the FIGS. 1 and 1' and 2, a scissor-like pull-off device for removing a plastic protective layer of an optical fiber is provided with two clamping jaws 1 that can be pivoted against one another, whereby optical fibers 2 of different sizes can be inserted therebetween. One of the two clamping jaws 1 and 1' has a heating jaw 3 let in the clamping jaws 1' and essentially aligns with its surface. The metallic heating jaw 3 is provided with an electrical heating element 4 with which the heating jaw 3 can be heated up to a temperature, which is above the softening temperature of a protective layer 5 of the optical fiber 2.

As shown in FIG. 2, the heating or heated jaw 3 and the clamping jaw 1 have flat sections which are facing each other. The heating jaw 3 has a pair of upstanding, longitudinally extending ribs 9 adjacent one side or edge, and these ribs 9 form a longitudinally extending groove 7. The jaw 1 has a longitudinally extending recess 10 for receiving the ribs 9.

The thinner optical fibers 2 are clamped between flat sections of the heating jaw 3 and of the clamping jaw 1. A considerably thicker optical fiber 2' is inserted into the longitudinal groove 7 of the heating jaw 3 and is mostly surrounded by the ribs 9. This results in such a good heating contact, so that the protective layer 5 of the thicker optical fiber 2' is softened within the same period of time as given the thinner optical fibers 2. The clamping jaws 1 and 1' are provided with pull-off edges 6, which cut into the protective layer 5 when the clamping jaws 1 are pressed together. The optical fibers 2 and 2' can be pulled out of the device after the protective layer 5 has been softened, whereby the protective layer 5 is retained by the pull-off edges 6 and is pulled off from the optical fiber core.

What is claimed is:

1. A pull-off device for removing a protective layer of at least one optical fiber, said pull-off device including a clamping jaw and a heating jaw which engage opposite sides of an optical fiber placed therebetween, at least one of the jaws having a pull-off edge which will cut into the protective layer of a fiber when the jaws are pressed together, the clamping jaw having a longitudinally extending recess, the heating jaw having a pair of raised ribs forming a longitudinal groove, said heating jaw and clamping jaw having flat sections adjacent the recess and ribs so that a thicker optical fiber can be received in the groove between the raised ribs of the heating jaw as thinner optical fibers are inserted between the flat sections of the clamping jaw and heating jaw.

2. A pull-off device according to claim 1, wherein the longitudinal groove has a circular cross section.

* * * * *